Aug. 22, 1939.  E. C. HORTON  2,170,264
WINDSHIELD CLEANER
Filed Sept. 2, 1936  2 Sheets-Sheet 1
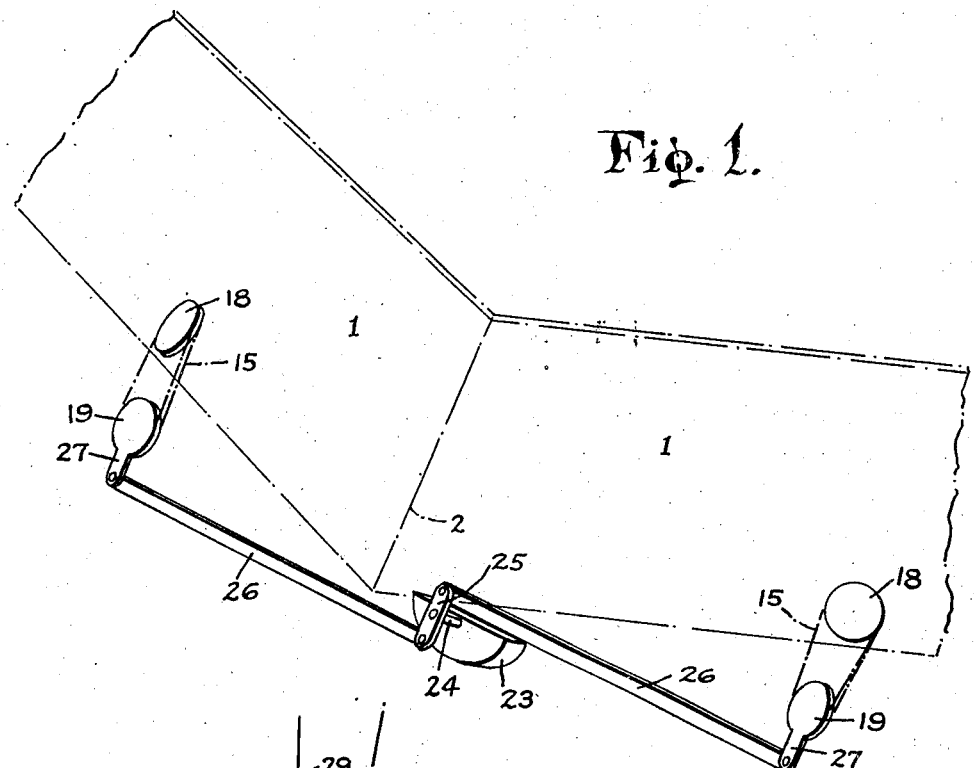
Fig. 1.
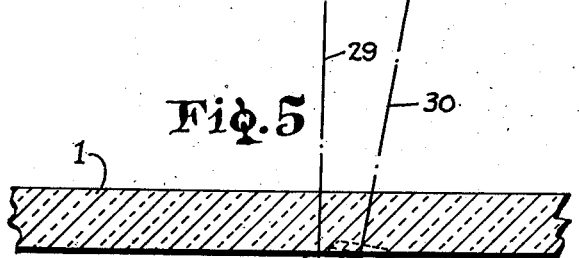
Fig. 5.
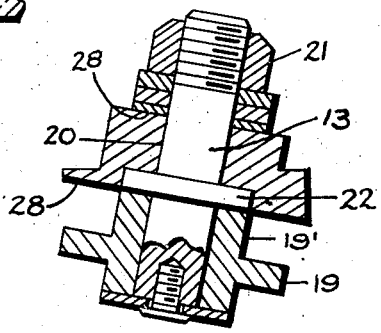
Fig. 6.
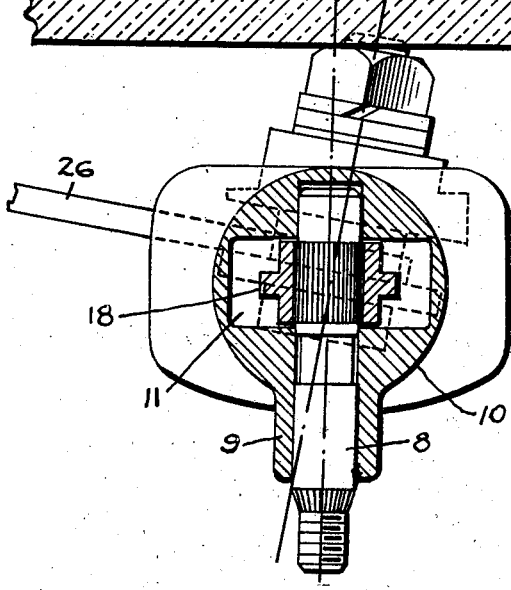
INVENTOR
Erwin C. Horton,
BY
Beau, Brooks Buckley & Beau.
ATTORNEY Aug. 22, 1939.  E. C. HORTON  2,170,264
WINDSHIELD CLEANER
Filed Sept. 2, 1936  2 Sheets-Sheet 2
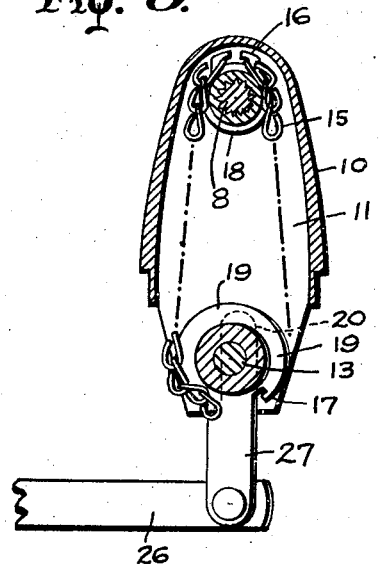
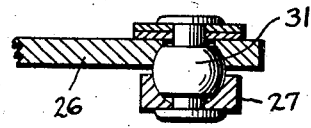
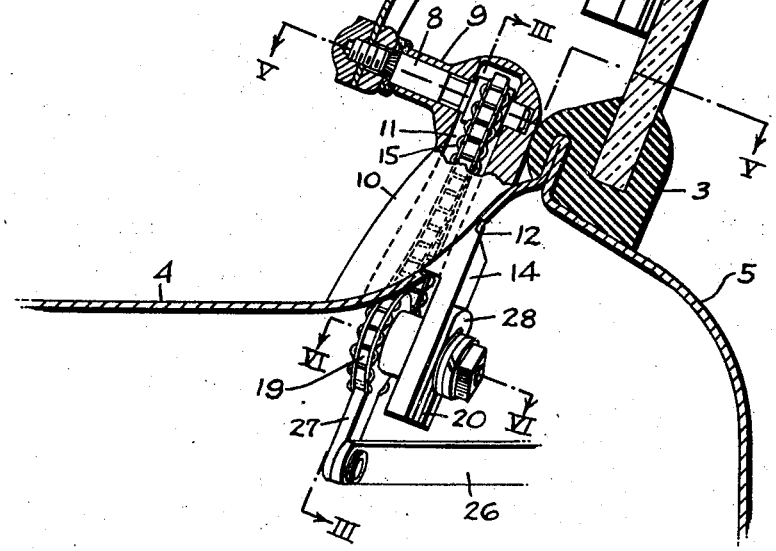
INVENTOR
Erwin C. Horton,
BY
Beau, Brooks, Buckley & Beau.
ATTORNEYS Patented Aug. 22, 1939

2,170,264

UNITED STATES PATENT OFFICE 2,170,264

WINDSHIELD CLEANER

Erwin C. Horton, Hamburg, N. Y., assignor to Trico Products Corporation, Buffalo, N. Y.

Application September 2, 1936, Serial No. 99,066

14 Claims. (Cl. 15—255)

This invention relates to a motor vehicle and especially to the windshield cleaner system thereof which is built into the fabricated body structure of the vehicle.

It has heretofore been the custom to drive spaced wipers on the standard single plane windshield from a common source of power, such as the well known suction operated cleaner motor. This motor has been frequently disposed between the wipers and connected thereto through a suitable linkage form of transmission. On certain makes of automobiles the present day windshield has veered toward the divided type in which right and left windshield sections are angularly related, forming a broad V, and sloping or inclining backwardly in an upward direction. This has necessitated the employment of two individual windshield cleaner motors, one for each section of the windshield. This not only has entailed additional expense but, since the trend is to mount the windshield cleaner at the lower side of the windshield, it has also been difficult to make proper installation in a practical manner.

The present invention has for its object to provide a windshield cleaner construction so incorporated or combined with the motor vehicle structure as to not only facilitate the installation, but to provide a cleaner movement which is efficient and quiet in operation. The invention further has for its object to provide a plural wiper windshield cleaner of practical construction and designed for installation on the divided type of windshield with the wipers being operated from a single source of power.

In the drawings:

Fig. 1 is a phantom view in perspective of a divided windshield showing the windshield cleaner installation diagrammatically;

Fig. 2 is a fragmentary sectional view through one section of the windshield showing the related wiper and its mounting, portions of the cleaner mechanism being broken away for the sake of clearness;

Fig. 3 is a sectional view through one of the wiper shaft mountings taken about on line 3—3 of Fig. 2;

Fig. 4 is a horizontal cross section through the connection between one of the power links and the connected driven arm;

Fig. 5 is a transverse sectional view about on line 5—5 of Fig. 2; and

Fig. 6 is a similar view about on line 6—6 of Fig. 2.

Referring more particularly to the drawings, the windshield of the motor vehicle comprises the two sections 1 which converge forwardly and form an angle, as indicated at 2. Each section is inclined or sloped rearwardly in an upward direction and is supported along its bottom edge in a waterproof manner, as indicated at 3, the cowl portion 4 extending forwardly therefrom and the instrument panel or interior moulding 5 extending inwardly and downwardly, as shown in Fig. 2.

Each windshield section 1 is provided with a wiper 6 that is operated thereover by an actuating arm 7. This arm is, in turn, fixed to a shaft 8 which is journaled in a bearing 9 of the hollow standard or housing 10. The shaft 9 is journaled at a normal to its related windshield section and since the latter slopes rearwardly the axis of the shaft 8 is likewise angularly displaced with respect to the horizontal. The chamber 11 of the hollow standard 10 opens downwardly through an aperture 12 in the forwardly extending cowl portion 4 of the vehicle body, the standard being firmly mounted, such as by suitable clamping means, so as to support the shaft above the cowl portion in proper relation to the windshield transparency.

Beneath the cowl portion 4 the bracket extension 14 supports an intermediate shaft 13 which preferably has its axis disposed at an incline to the horizontal and substantially parallel to the plane of the wiper actuating shaft 8. For ease of installation the bracket extension 14 is formed integrally with the hollow standard 10 and designed to be inserted downwardly through the cowl opening 12. The two shafts 8 and 13 are supported on the standard as a unit, with the lower shaft 13 providing journal support for the hub 19' of a pulley or wheel 19. One or more flexible links or chains 15, which may be joined to form an endless member if desired, connect the wheel 19 to a preferably smaller wheel 18 fixed on the shaft 8. Consequently, when the lower wheel 19 is oscillated, the wiper actuating shaft will also oscillate.

In practice two independent chains are provided, since this facilitates their attachment to the teeth or projections 16 and 17 on the wheels. Preferably two projections occur on each wheel and these are undercut to overhang in opposite directions for more intimately engaging and interlocking with the terminal loops of the chains. Because of this mode of attachment the remaining peripheral portions of the thus mutilated rims of the wheels may be uninterrupted to support the chains as the wheels oscillate.

To facilitate the interengagement of the chains with the wheel teeth, and also to take up unnecessary slack in the chains, the lower shaft 13 is adjustably mounted in a slot 20 of the depending bracket part 14. After the chains have been properly placed, the lower shaft is moved downwardly in the slot 20, to take up all unnecessary slack in the chains, and then firmly secured in such position by a clamping nut 21 and a cooperating shoulder 22 on the shaft 13 embracing the opposite face portions 28 of the bracket part (Figs. 2 and 6).

Power is transmitted to the two lower shafts from a common source of power which may be any suitable motor or drive part and is rendered readily accessible by disposing the same preferably intermediate the spaced wipers. The source of power depicted embodies a motor 23 having an oscillating drive shaft 24 from which power is transmitted to the oppositely spaced wheels 19 for imparting oscillatory movement to the latter. In the illustrated embodiment of the invention, the drive shaft has fixed thereon a cross arm 25 with the opposite ends thereof projecting from the shaft and connected by oppositely extending push-pull links 26 to the respective wheels 19, as by means of a crank arm 27 fixed thereon. Oscillation of the drive shaft 24 will reciprocate the links simultaneously in opposite directions and, through the chain and wheel transmission, cause the wipers 6 to move back and forth over the respective windshield sections. For each in manufacture and assembly this crank arm 27 may be formed integrally with the hub 19'.

To avoid binding of parts by reason of the angular disposition of the wiper shafts 8 with respect to the drive shafts 24, and also to obtain the maximum power without subjecting the light motor to unnecessary load, the crank arms 27 are caused to move in a plane substantially parallel to the plane of movement of the links 26. This necessitates the intermediate shafts 13 to be disposed with their longitudinal axes substantially parallel to that of the drive shaft 24 and in a plane practically normal to the plane of said reciprocating links. Such disposition of the shafts is accomplished herein by having the opposite bearing faces 28 of the bracket extension 14 angularly displaced from the plane of the related windshield section and disposed more nearly parallel with the plane of operation of the links.

Therefore, the two shafts 8 and 13 of each unit, while having their longitudinal axes displaced practically to the same degree from the horizontal, are angularly displaced relative to each other from the vertical. This angular displacement is illustrated on an enlarged scale in Fig. 5 wherein the axis of rotation of the wiper actuating shaft 8 is indicated by broken line 29 as being normal to the windshield section, whereas the longitudinal axis of the fixed shaft 13 is indicated by the broken line 30 and as being normal to the plane of operation of the link 26. This angular displacement is permitted by the flexibility in the transmission between the rims of the wheels 18 and 19 in each unit.

From the foregoing it may be observed that the driving shaft 24 and the intermediate shafts 13 operate in planes substantially parallel to each other while the wiper shafts 8 are angularly displaced with respect thereto so that they may oscillate about axes normal to their respective windshield sections. When installing the cleaner mechanism on a vehicle, the wiper mounting units are readily mounted on the cowl in fully assembled condition with the two shafts of each unit being angularly displaced so that the wiper shaft 8 will oscillate about its axis, generally indicated at 29 (Fig. 5), normal to the windshield, while the intermediate shaft will oscillate about its axis, indicated by the broken line 30, in substantial parallelism with the plane of the shaft 24. The outer ends of the links 26 may be connected to the crank arms 27 through balled joints 31, which maintain firm connections or joints between the arms and the links and facilitate the installation of the windshield cleaner.

While the foregoing description has been given in detail it is obvious that the inventive concept is capable of other physical embodiments without departing from the scope or spirit of the invention claimed.

What is claimed is:

1. A windshield cleaner for a motor vehicle, comprising a unit mountable and demountable as a whole and having a wiper shaft, means for supporting the shaft substantially normal to the windshield, said means having a part for mounting the same exteriorly of the vehicle and a second part extending interiorly of the vehicle, a second shaft supported by said second part at an angle to said wiper shaft, and a flexible pull member directly connecting the angularly related shafts, said second shaft having a part connectible to a source of power for being operated thereby.

2. A windshield cleaner for a motor vehicle having a windshield and a body portion extending forwardly thereof, comprising a unit mountable and demountable as a whole and having a wiper shaft, means for supporting the shaft substantially normal to the windshield, said means having a part for mounting the same exteriorly on the body portion with a second part extending therethrough to the interior side of such body portion, a second shaft supported by said second part at an angle to said wiper shaft, said second part having a slot in which said second shaft is mounted for adjustment toward and from the first shaft, a flexible member operatively connecting the two shafts, and means accessible from the interior side of such body portion for adjustably securing said second shaft whereby any slack in the flexible member may be taken up, said second shaft having a part connectible to a source of power for being operated thereby.

3. In a windshield cleaner for angularly related windshield sections of a motor vehicle, comprising a wiper shaft for each section, a power transmitting shaft associated with each wiper shaft, means supporting the two shafts of each windshield section with the axis of the wiper shaft substantially normal to such section and the axis of the power transmitting shaft angularly related to the wiper shaft but parallel to the power transmitting shaft of the companion windshield section whereby the two power transmitting shafts may be driven by parts moving in the same plane with each other, a flexible transmission connecting each wiper shaft with its associated power transmitting shaft, a drive shaft interposed between the power transmitting shafts in substantial parallelism thereto, and rigid parts directly connecting the latter to the drive shaft.

4. A windshield cleaner mountable and demountable as a unit and comprising an operating shaft, a housing for mounting the shaft on a vehicle forwardly of the windshield, said housing being closed at its outer shaft supporting portion and opened at its inner portion interiorly of the vehicle, an oscillatable power transmitting shaft supported by the housing interiorly of the vehicle, a member fixed on each shaft, flexible connecting means in the housing coupling the members of the two shafts, and means for adjusting one shaft relative to the other for taking up slack in the flexible connecting means.

5. A windshield cleaner comprising a unit mountable and demountable as an entirety and composed of an operating shaft, a housing for mounting on the cowl part of a motor vehicle to support the shaft substantially normal to the windshield surface, an oscillatable power transmitting shaft, journaled in a part rigidly related to said housing, spaced projections extending radially from each shaft, and chain connecting means on opposite sides of the shafts and interengaged with the projections whereby operation of one shaft will impart like movement to the companion shaft, said connecting means being disposed within the housing.

6. A windshield cleaner unit for mounting in an opening provided in the body portion of a motor vehicle in front of the windshield thereof, said unit comprising a housing for seating over the opening and having a part extending therethrough to the interior side of the body portion, a shaft journaled in the outer end portion of the housing for actuating a wiper carrying arm, the housing being otherwise closed to the weather, an oscillating member adjustable supported on said part, and flexible means arranged within the housing and operatively connecting said member to the shaft, said member being adjustable to take up slack in the flexible connecting means and having a radially extending part for connection to a source of power for being oscillated thereby.

7. In a windshield cleaner for use on a motor vehicle having a vertically divided windshield with the sections thereof angularly related, a wiper shaft for each windshield section, housing means for each shaft supporting the same normal to the respective section and in convergent relation with the companion wiper shaft, a power transmitting shaft associated with each wiper shaft and supported inwardly from that portion of the housing means which supports the wiper shaft, with the two power transmitting shafts being arranged in parallel relation to the companion power transmitting shaft, flexible transmission means within the housing means operatively connecting each power transmitting shaft to its associated wiper shaft in an individually mountable unit, and a common drive operatively connecting the parallel power transmitting shafts for operating the same.

8. In a windshield cleaner, a unit mountable and demountable as an entirety and comprising a shaft, a housing supporting the shaft at a normal to the windshield, a power transmitting shaft supported by the housing within the vehicle, said housing having a part extending through an opening in the vehicle to the interior thereof for supporting said power transmitting shaft therein, flexible means operatively connecting the two shafts, and means adjustably supporting the power transmitting shaft on said housing part for taking up any slack in the flexible connecting means; operating means for the power transmitting shaft of the unit, and transmission means flexibly connecting said operating means to the power transmitting shaft and permitting of such adjustment of the latter.

9. A windshield cleaner for a motor vehicle comprising a unit mountable and demountable as a whole and having a wiper actuating shaft, a housing for supporting the shaft exteriorly of and normal to the related windshield, said housing having a part extending interiorly of the vehicle, a power transmitting shaft supported on said part interiorly of the vehicle, and a flexible pull member within the housing directly connecting the two shafts, said second shaft having a part connectible to a driving member for being actuated thereby.

10. A windshield cleaner unit comprising a housing for mounting on the body portion of a motor vehicle in front of the windshield thereof and having a part extending therethrough to the interior side of the body portion, a shaft journaled in the outer end portion of the housing for actuating a wiper carrying arm, the housing being otherwise closed to the weather, a member rotatably supported upon said part at the interior side of the body portion, and a pair of flexible members disposed within the housing on opposite sides of the shaft and rotatable member and operatively connecting the same for oscillatory movement, said rotatable member being of larger diameter than the shaft so as to increase the angular movement of the latter relative to that of the rotatable member, said unit being mountable and demountable as an entirety and adapted for connection to a source of power.

11. In a motor vehicle having rearwardly extending and angularly related windshield sections, an underlying body frame member, and a forwardly extending cowl; a wiper shaft journaled on the cowl at a normal to each section, a windshield cleaner drive disposed on said frame member beneath the space between the windshield sections and having a driving crank member, the axes of the wiper shafts being angularly related to each other and to that of the driving crank member, and a transmission unit interposed between the crank member and each wiper shaft, each unit comprising a reciprocatory link connected at one end to the crank member, an oscillatable member connected to the opposite end of the link by a ball and socket joint and itself having spaced projecting portions, and means connecting each of the projecting portions of said oscillatable member to the adjacent wiper shaft.

12. A windshield cleaner, comprising a unit mountable and demountable as an entirety and composed of an operating shaft, a housing for mounting on the cowl part of a motor vehicle to support the shaft substantially normal to the windshield surface, an oscillatable power transmitting shaft journaled in a part rigidly related to said housing, members extending radially from each shaft, and connecting members on opposite sides of the shafts interengaged at each end with a respective one of the shaft carried members by means of a projection on one member and a receiving recess in the other member, whereby operation of one shaft will impart like movement to the companion shaft, said connecting members being diposed within the housing.

13. A windshield cleaner for a motor vehicle, comprising a unit mountable and demountable as a whole and having a wiper actuating shaft, a housing for supporting the shaft exteriorly of and normal to the related windshield, said housing having a part extending interiorly of the vehicle, a power transmitting shaft supported on said part interiorly of the vehicle, and a connecting member within the housing having terminal openings engaging over projecting parts on the two shafts for connecting the same, said second shaft having a radial arm adapted to be linked to a driving member for being oscillated thereby.

14. A windshield cleaner unit, comprising a housing for mounting on the body portion of a motor vehicle in front of the windshield thereof and having a part extending therethrough to the interior side of the body portion, a shaft journaled in the outer end portion of the housing for actuating a wiper carrying arm, the housing being otherwise closed to the weather, a member rotatably supported upon said part at the interior side of the body portion, and a pair of members disposed within the housing on opposite sides of the shaft and rotatable member and each having terminal eyes engaging over projecting parts on the shaft and rotatable member to connect the same for oscillatory movement, said rotatable member having its projecting parts operating on a greater radius than the projecting parts on the shaft so as to increase the angular movement of the latter relative to that of the rotatable member, said unit being mountable and demountable as an entirety and adapted for connection to a source of power.

ERWIN C. HORTON.